US010775206B2

(12) United States Patent
Ramasubramanian et al.

(10) Patent No.: US 10,775,206 B2
(45) Date of Patent: Sep. 15, 2020

(54) SENSOR HUB BATCH PACKING

(71) Applicant: QuickLogic Corporation, Sunnyvale, CA (US)

(72) Inventors: Rajasekaran Ramasubramanian, Ojai, CA (US); Dung Le, Alviso, CA (US)

(73) Assignee: QuickLogic Corporation, San Jose, CA (US)

( * ) Notice: Subject to any disclaimer, the term of this patent is extended or adjusted under 35 U.S.C. 154(b) by 1028 days.

(21) Appl. No.: 15/163,474

(22) Filed: May 24, 2016

(65) Prior Publication Data

US 2017/0343392 A1 Nov. 30, 2017

(51) Int. Cl.
*G01D 9/32* (2006.01)
*H03M 7/30* (2006.01)
*H04L 9/32* (2006.01)
*G06F 9/46* (2006.01)
*G01D 21/02* (2006.01)
*G01D 9/00* (2006.01)

(52) U.S. Cl.
CPC .............. *G01D 9/32* (2013.01); *G01D 21/02* (2013.01); *G06F 9/467* (2013.01); *H03M 7/30* (2013.01); *H04L 9/3297* (2013.01); *G01D 9/005* (2013.01)

(58) Field of Classification Search
CPC .......... G01D 9/32; G01D 21/02; G01D 9/005; G06F 9/467; G06F 12/0891; G06F 9/3001; G06F 16/215; G06F 7/588; H03M 7/3297; H03M 7/6005; H03M 7/40; G07C 5/085
See application file for complete search history.

(56) References Cited

U.S. PATENT DOCUMENTS

| | | | |
|---|---|---|---|
| 4,819,079 A | 4/1989 | Tako | |
| 6,065,066 A | 5/2000 | Tan | |
| 6,339,386 B1* | 1/2002 | Cho | H03M 7/40 341/100 |
| 6,653,953 B2 | 11/2003 | Becker et al. | |
| 9,298,457 B2* | 3/2016 | Wegener | G06F 9/3001 |
| 2003/0021411 A1* | 1/2003 | Seroussi | G06F 7/588 380/46 |
| 2012/0290166 A1* | 11/2012 | Wallace | G07C 5/085 701/29.2 |
| 2015/0188563 A1* | 7/2015 | Dickie | H03M 7/6005 708/203 |
| 2015/0331805 A1* | 11/2015 | Daga | G06F 12/0891 711/133 |
| 2017/0039229 A1* | 2/2017 | Verma | G06F 16/215 |

* cited by examiner

*Primary Examiner* — Regis J Betsch
*Assistant Examiner* — Kaleria Knox
(74) *Attorney, Agent, or Firm* — Omkar K. Suryadevara; Silicon Valley Patent Group LLP

(57) ABSTRACT

A sensor hub includes a bit packer that receives sensor data from a plurality of sensors and bit packs the sensor data so that the sensor ID, time stamp and each axis of the measured data is stored contiguously. The bit packer may compress the sensor data by removing the sensor ID and/or the time stamp in the sensor data. The bit packed sensor data is stored in batching memory. A bit unpacker receives the sensor data from the batching memory and unpacks the sensor data, e.g., so that the sensor ID, time stamp and each axis of the measured data is stored in its own word. Additionally, the bit unpacker may decompress the bit packed sensor data by reinserting the sensor ID and/or time stamp in the sensor data.

24 Claims, 12 Drawing Sheets

SENSOR HUB BATCH PACKING

BACKGROUND

As sensor-based applications and use cases become more prevalent in electronic devices such as smartphones and wearable devices, the need for sensor hubs is increasing. A sensor hub is a device, such as a microcontroller unit, coprocessor, or digital signal processor (DSP) that assists in the integration and processing of data from different sensors before providing the sensor data to a radio or application processor in the electronics device. By off-loading these tasks from a main central processing unit in the electronics device to a sensor hub, the battery consumption and performance of the electronics device may be improved.

While sensor hubs may reduce power consumption of the main central processing unit of the electronic device, the sensor hubs also consume power. Moreover, sensor hubs are sometimes required to implement always-on, always-aware sensing in electronic devices, which may use a considerable amount of power, even when the electronic device is not being actively used. As battery life becomes an increasingly important consideration for electronic devices, it has become desirable to reduce the power consumption of the sensor hub itself.

SUMMARY

A sensor hub includes a bit packer that receives sensor data from a plurality of sensors and bit packs the sensor data so that the sensor ID, time stamp and each axis of the measured data is stored contiguously. The bit packer may compress the sensor data by removing the sensor ID and/or the time stamp in the sensor data. The bit packed sensor data is stored in batching memory. A bit unpacker receives the sensor data from the batching memory and unpacks the sensor data, e.g., so that the sensor ID, time stamp and each axis of the measured data is stored in its own word. Additionally, the bit unpacker may decompress the bit packed sensor data by reinserting the sensor ID and/or time stamp in the sensor data.

In one implementation, a sensor hub includes a sensor interface configurable to be coupled to receive sensor data from a plurality of sensors; a bit packer coupled to receive the sensor data from the sensor interface and to generate bit packed sensor data; batching memory coupled to the bit packer to receive and store the bit packed sensor data; a bit unpacker coupled to the batching memory to receive and unpack the bit packed sensor data to regenerate the sensor data; and an application processor interface coupled to receive the sensor data from the bit unpacker, the application processor interface configurable to be coupled to provide the sensor data to an application processor.

In one implementation, a method includes receiving sensor data from a plurality of sensors; packing the sensor data from the plurality of sensors to generate bit packed sensor data; storing the bit packed sensor data in a batch memory in the sensor hub; unpacking the bit packed sensor data stored in the batch memory to produce regenerated sensor data; and transmitting the regenerated sensor data by the sensor hub to an application processor.

In one implementation, a sensor hub includes means for interfacing with sensors that is configurable to be coupled to receive sensor data from a plurality of sensors; means for bit packing sensor data received from the plurality of sensors to generate bit packed sensor data; means for batching and storing the bit packed sensor data; means for bit unpacking the bit packed sensor data to regenerate the sensor data; and means for interfacing with an application processor that is configurable to be coupled to provide the sensor data to the application processor.

DETAILED DESCRIPTION

Figure 1:
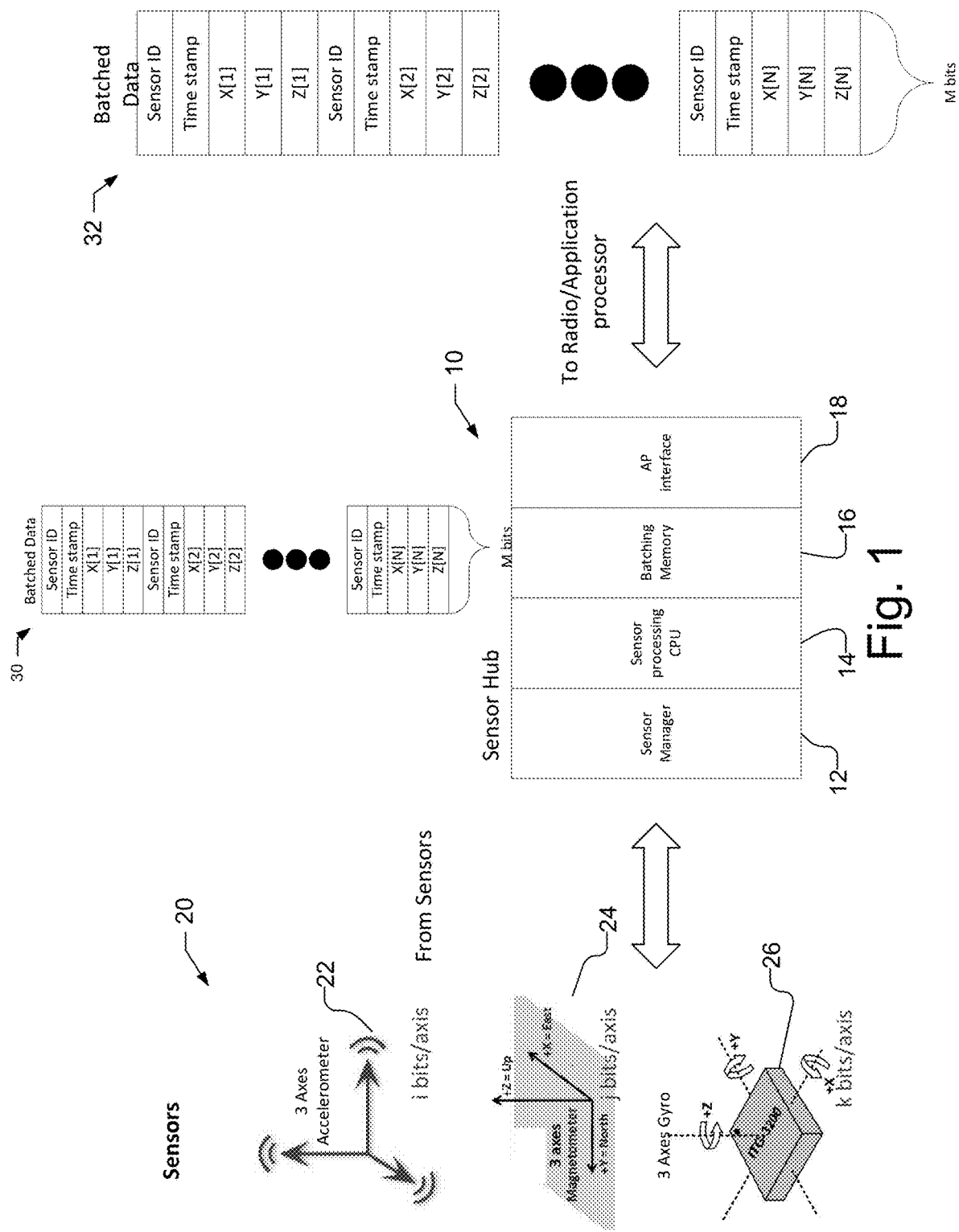
FIG. 1 is a block diagram illustrating a conventional sensor hub capable of batching sensor data.

FIG. 1 is a block diagram illustrating a sensor hub 10, which may be an integrated circuit (IC) that includes all components in a single chip, i.e., a system on a chip (SoC). The sensor hub 10 may include a sensor manager 12, sensor processing CPU 14, batching memory 16, and AP (Application Processor) interface 18. The sensor manager 12 is in communication with and receives raw data from the sensors 20 including, by way of example, a 3 axis accelerometer 22, a 3 axis magnetometer 24 and a 3 axis gyroscope 26. The sensor processing CPU 14 performs any desired integration and processing of the sensor data, while the batching memory 16 stores the data from the sensors. The AP interface 18 provides the batched data 30 to the radio or application processor in the electronic device. As illustrated, the batched data includes an ID of the sensor (Sensor ID), a time stamp, as well as the data from the sensor, illustrated here as data from three axes.

In a typical sensor hub, the sensor data may not be immediately consumed by an application. In order to save power, the application processor need not be woken up often to either consume or store the data. Instead, the sensor data may be kept or stored in the sensor hub, as the sensor hub is a low power device compared to the application processor. The process of storing the sensor data in the sensor hub until required by the application processor is referred to as "batching" and the memory used to store the sensor data is called "batching memory." FIG. 1 illustrates a typical sensor hub in which the data produced by the sensors 20 undergoes batching and is stored in the batch memory 16, as illustrated by batched data 30. Conventionally, the sensor data is stored in batching memory 16 so that the sensor identification, a time stamp and each axis of the measured data is stored in a different M bit wide word, where M may be, e.g., 32 bits. Thus, batching in a conventional sensor hub requires a large batch memory 16, which leads to a correspondingly large amount of power consumption, as well as increases the cost and area of the batch memory 16 in the sensor hub 10. During a memory dump, the sensor data is produced by the AP interface 18 to the radio or application processor in the electronic device in substantially the same form that it is stored in batching memory 16, as illustrated by batched data 32.

Figure 2:
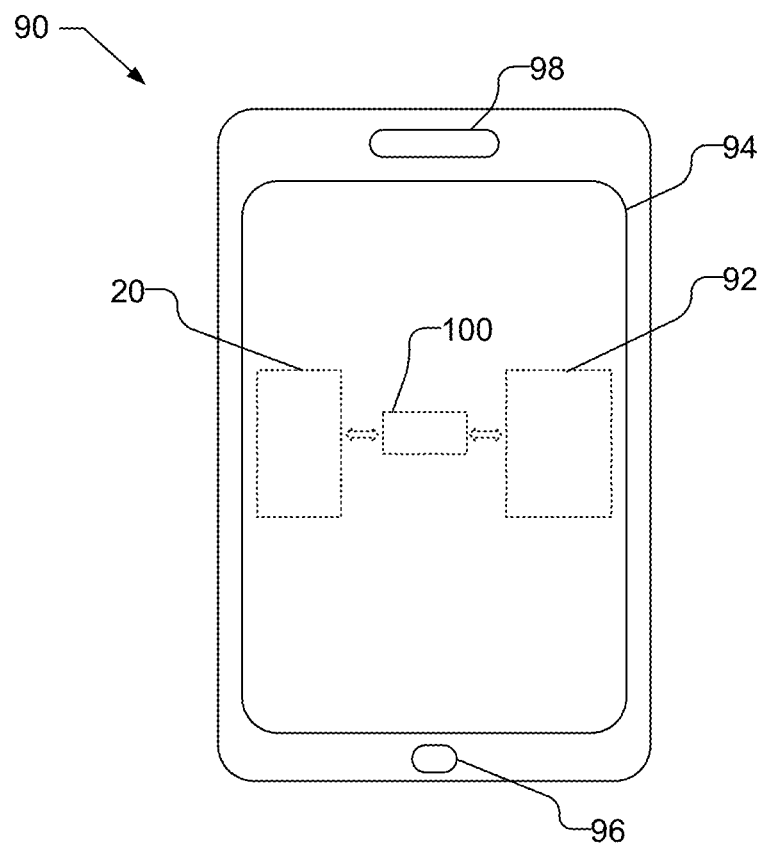
FIG. 2 illustrates an electronic device that includes a sensor hub capable of bit packing and unpacking sensor data.

FIG. 2 illustrates an electronic device 90 that includes sensors 20, at least one main processor 92, which may be, e.g., a radio and/or application processor, and a sensor hub 100 disposed between the sensors 20 and the processor 92. The sensor hub 100, as illustrated by arrows, is capable of receiving sensor data from the sensors 20 and providing the sensor data to the main processor 92. The sensor hub 100 is capable of packing and unpacking the sensor data during batching, as described herein. An important attribute of batching memory is that it is not accessed in real time, and accordingly, packing and unpacking latency does not demand strict memory read/write time requirements. The sensors 20, processor 92, and sensor hub 100 are illustrated with dotted lines as they are internal to the electronic device 90. The electronic device 90 is illustrated as a smartphone with a display 94, microphone 96 and speaker 98, but it should be understood that the electronic device 90 may be any device in which batching of sensor data may be performed, including a cellphone, laptop, tablet, PDA, tracking device or other electronic devices.

Figure 3:
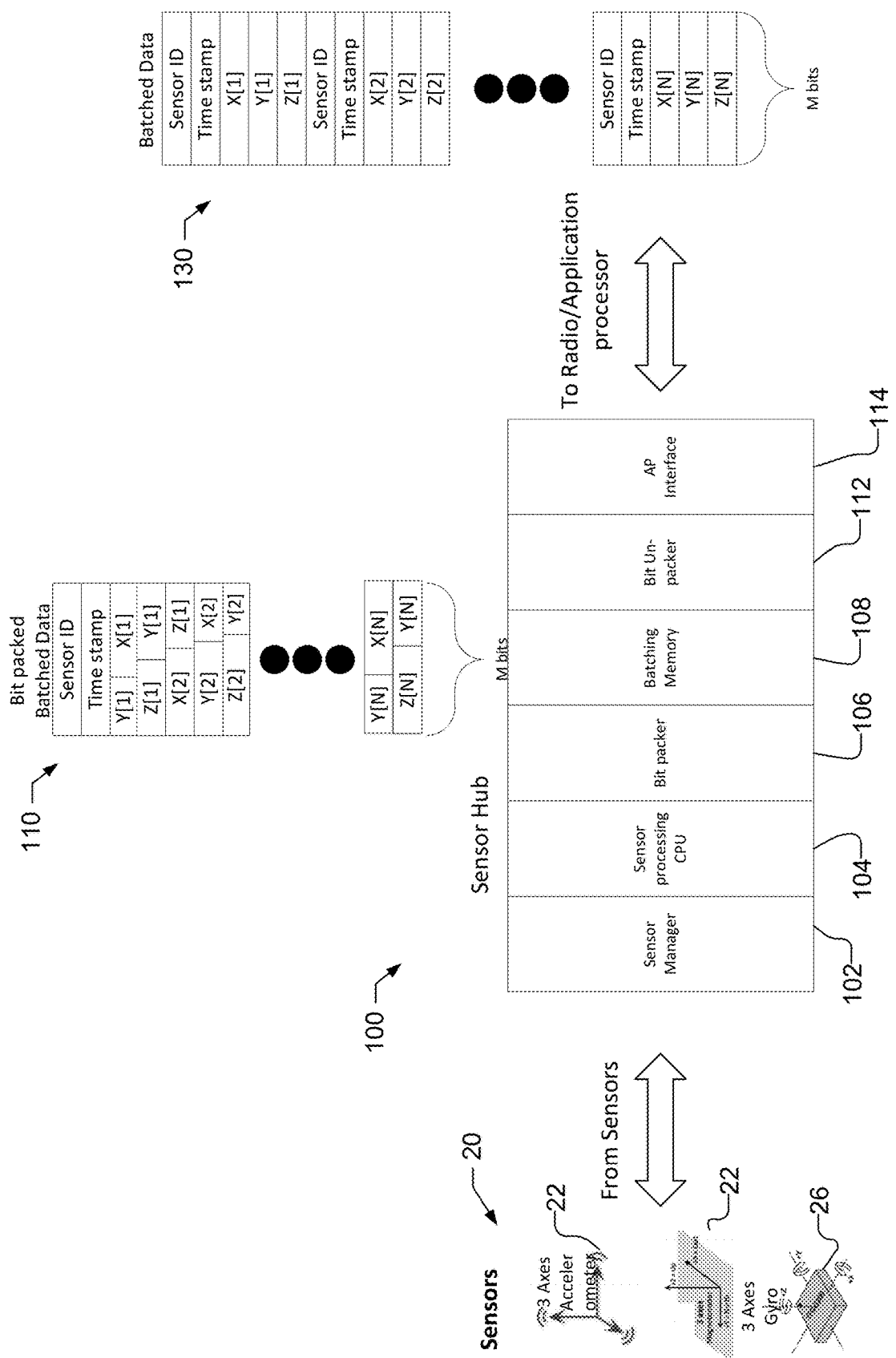
FIG. 3 is block diagram illustrating a sensor hub capable of bit packing and unpacking sensor data before and after storing in batching memory.

FIG. 3 is block diagram illustrating the sensor hub 100, similar to that shown in FIG. 1, but that is capable of packing and unpacking the batched sensor data. The sensor hub 100 may be, e.g., an integrated circuit (IC) that includes all components in a single chip, i.e., a system on a chip (SoC), and which may be installed in an electronics device, such as electronic device 90 shown in FIG. 2, between sensors 20 and any processor or processors (or any other component in the electronic device 90) that uses the data from the sensors 20, such as main processor 92 shown in FIG. 2, which may be, e.g., a radio or application processor. The sensor hub 100 may include a sensor manager 102 that is in communication with and receives raw data from the sensors 20, which, as also illustrated in FIG. 1, may be a 3 axis accelerometer 22, a 3 axis magnetometer 24 and a 3 axis gyroscope 26. If desired, additional, fewer and/or different sensors may be used, such as inertial, photonic, environmental and/or wellness sensors. The sensor manager 102 may be coupled to provide the sensor data to a sensor processing CPU 104, which may perform any desired integration and/or processing of the sensor data. The operation of the sensor manager 102 and sensor processing CPU 104 within sensor hub 100 may be conventional.

The sensor hub 100 includes a bit packer 106, which receives the sensor data, e.g., from the sensor processing CPU 104, and generates bit packed sensor data, which is stored in batching memory 108, illustrated in FIG. 3 as bit packed batched data 110. The batching memory 108 is M bits wide, where M may be 32 bits or any other desired size. The bit packer 106 may be, e.g., a hardware unit, that is specifically configured to pack the bits of the sensor data. The bit packed batched data 110, for example, is illustrated for a single sensor, and as shown includes one instance of the sensor identification (ID) and the time stamp, which are associated with the data for three axes (X, Y, and Z) of the sensor for multiple times [1]-[N]. The single instance of the time stamp in the bit packed batched data 110 is the time stamp associated with the first time [1] that the data for the sensor is read. The bit packer 106 packs the sensor data, e.g., so that the measured data is contiguous in the batching memory 108, i.e., so that data for multiple axes (e.g., X[1] and a portion of Y[2]) fills each M bit word, as opposed to having each axis of the measured data stored in a different M bit wide word, as illustrated in batched data 30 in FIG. 1. If desired, the sensor ID and time stamp, if less than M bits, may similarly be packed to be contiguous in an M bit word. Additionally, the bit packer 106 may be configured to compress the bit packed batched data 110 so that there is only a single instance of the sensor ID and/or time stamp associated with the data from a single sensor, by removing the sensor ID and the time stamp in any set of data from a sensor that is not the first set of data stored in batched memory 108.

The sensor hub 100 further includes a bit unpacker 112, which receives the bit packed batched data 110 from the batching memory 108 and unpacks the bits of the sensor data to regenerate the sensor data, e.g., in the form of the batched data 130, which is received by AP interface 114 and provided to the appropriate component of the electronics device, such as a radio and/or application processor 92 of the electronics device 90 shown in FIG. 2. The bit unpacker 112 may be, e.g., a hardware unit, that is specifically configured to unpack the bits of the bit packed batched data 110. The regenerated batched data 130, for example, is illustrated for a single sensor, and shows that a sensor ID, and a time stamp is associated with the data for three axes (X, Y, and Z) for each separate time [1]-[N]. The bit unpacker 112 unpacks the sensor data so that the sensor ID, time stamp and each axis of the measured data is stored in a different M bit wide word. Additionally, the bit unpacker 112 may be configured to decompress the bit packed batched data 110, e.g., by reinserting the sensor ID and/or time stamp in each new set of sensor data. For example, time stamps removed by the bit packer 106 maybe regenerated and reinserted into each data set, based on the time stamp for the first data set, as well as the known sample rate for the sensor and the number of the data sets between the first data set and each data set.

Advantageously, the bit packer 106 and bit unpacker 112 may be configurable to operate with different sensors having different sampling rates and/or different lengths of data. For example, some sensors such as accelerometers may be sampled at 50 Hz, while other sensors, such as magnetometers and gyroscopes may be sampled at 10 Hz, and other sensors, such as barometers, may be sampled at 5 Hz. The bit packer 106 and bit unpacker 112 may be configurable to bit pack and unpack the sensor data from multiple sensors with different sampling rates. Additionally, different sensors may have a different number of bits in the measured data. The bit packer 106 and bit unpacker 112 may be configured to pack and unpack different number of bits in the sensor data from different sensors into the same length word in memory. The bit packer 106 and bit unpacker 112 may be configurable to bit pack and unpack, as well as compress and uncompresss the sensor data from multiple sensors with different sampling rates. The bit packer 106 and bit unpacker 112 further may be configurable to compress and uncompresss the sensor data from multiple sensors with different sampling rates and/or data lengths. For example, the bit packer 106 may be configured to store only a single instance of the sensor ID and/or time stamp associated with the data from a single sensor, e.g., by removing the sensor ID and the time stamp in any set of data from a sensor that is not the first set of data stored in batched memory 108. The bit unpacker 112 may be configured to recover and reinsert the sensor ID and/or time stamp in each new set of sensor data, e.g., based on the time stamp for the first data set, as well as the known sample rate for the sensor and the number of the data sets between the first data set and each data set.

Figure 4:
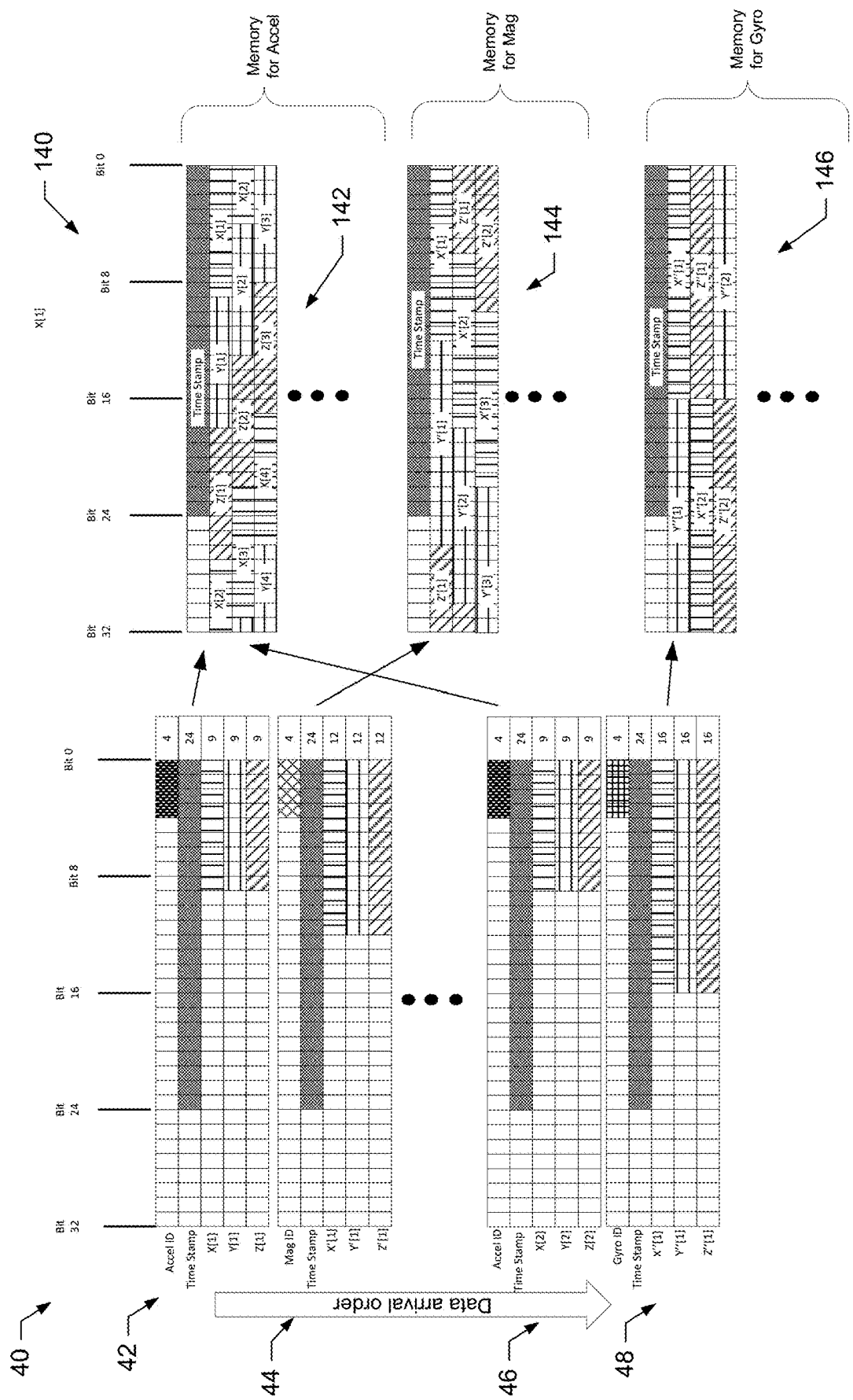
FIG. 4 illustrates raw sensor data that is bit packed to produce bit packed batched sensor data.

FIG. 4, by way of example, illustrates the raw data 40 from the sensors 20 as received by the bit packer 106, e.g., from the sensor processing CPU 104, and packed into bit packed batched sensor data 140 stored in batching memory 108. Raw data 40 illustrates the effective bits from the sensors relative to the M bit, e.g., 32 bit, word length of the batching memory 108, for the sake of reference. It should be understood, however, that typically only the effective bits from the sensors is received by the bit packer 106 and not the full 32 bit word. Raw data 40 illustrates the data in the order of arrival to the bit packer 106, e.g., with an initial set of accelerometer data 42 received, followed by an initial set of magnetometer data 44, followed by a second set of accelerometer data 46, followed by an initial set of gyroscope data 48.

As illustrated each set of data includes a sensor ID, a time stamp of when the sensor ID was produced (or received by the sensor manager 102 or sensor processing CPU 104), and data for three axes. The initial set [1] of accelerometer data 42 and second set [2] of accelerometer data 46 are illustrated as including 9 bits of data for each of the three axes (X, Y, and Z) from two times, with a 4 bit Accel ID, and a 24 bit time stamp associated with each set of data 42 and 46. The initial set [1] of magnetometer data 44 is illustrated as including 12 bits of data for each of the three axes (X', Y', and Z') along with the associated 4 bit Mag ID, and a 24 bit time stamp. The initial set [1] of gyroscope data 48 is illustrated as including 16 bits of data for each of the three axes (X", Y", and Z"), along with the associated 4 bit Mag ID, and a 24 bit Time Stamp. It should be understood that the number of bits is provided only by way of example.

Additionally, it should be understood that only an initial set of data is illustrated in the raw data 40 for the magnetometer and gyroscope, there may be multiple sets of data from each sensor, including the magnetometer and gyroscope, with a 4 bit sensor ID, and a 24 bit time stamp associated with each separate set of data. Moreover, while an identifier, e.g., [1], is included in the data sets 42, 46, and 48, it will be understood that these data sets may be collected at different times, and thus, may have different time stamps. Further, data from the sensors may be collected at different sampling rates. For example, the accelerometer may be collected at 50 Hz, while the magnetometer and gyroscope may be collected at 10 Hz. Accordingly, the raw data 40 may include a different number of sets of data for each sensor, e.g., the accelerometer data collected at 50 Hz may have 5× the amount of sets in the raw data 40 as the magnetometer and gyroscope data collected at 10 Hz. Additionally, as the raw data 40 is in arrival order, there will be 5 sets of accelerometer data, when collected at 50 Hz, between sets of magnetometer data, when collected at 10 Hz, as well as between sets of gyroscope data, when collected at 10 Hz.

As illustrated by the raw data 40 in FIG. 4, the sensors 20 may generate data at different bit lengths. As a consequence, without packing, the batching memory 108 that stores the sensor data 40 must have a length that is sufficient to store at least the longest bit length in the sensor data. For example, in FIG. 4, all of the sensor data in raw data 40 has bit lengths that are less than the M bit, e.g., 32 bit, word length in the batching memory 108. Accordingly, if the raw data 40 were to be batched in batching memory without packing, as is conventional, there would be a significant amount of unused memory bits, illustrated by the white boxes in FIG. 4. Moreover, each set of sensor data is shown as being associated with the sensor ID and time stamp. Accordingly, without packing and compressing, the batching memory would require frequent memory dumps and therefore would be underutilized or the batching memory would require a considerable memory size in order to batch a significant amount of sensor data between memory dumps.

FIG. 4 additionally illustrates the bit packed batched sensor data 140, such as may be produced by bit packer 106 and stored in batching memory 108 in sensor hub 100, shown in FIG. 3. As illustrated, the data from each sensor is stored in memory that is allocated to that sensor. Thus, for example, the raw accelerometer data 42 and 46 is stored as accelerometer data 142 in memory that is allocated for the accelerometer, the raw magnetometer data 44 is stored as magnetometer data 144 in memory that is allocated for the magnetometer, and the gyroscope raw data 48 is stored as gyroscope data 146 in memory that is allocated for the gyroscope. Of course, if additional or fewer sensors are used, the allocated memory would accordingly differ. Moreover, the amount of allocated memory used for each sensor may be based on the sensor rate of the sensors. For example, the memory allocated for the accelerometer may be 5× more than the magnetometer or gyroscope, if the accelerometer data is collected at 50 Hz and the magnetometer and gyroscope data is collected at 10 Hz.

The bit packed batched sensor data 140 is stored in M bit words, e.g., 32 bits, in batching memory 108. The bit packed batched sensor data 140 stores the sensor data for each axis contiguously in the bit packed batched sensor data 140, thereby filling each M bit word in memory with sensor data. In some instances, the sensor data that does not fit into a word in memory starts the next word in memory. Additionally, as can be seen, bit packed batched sensor data 140 may be compressed, e.g., by removing the sensor ID and the time stamp from one or more sets of sensor data. For example, as can be seen, bit packed batched sensor data 140 may be compressed by not storing the sensor ID. With the data for each sensor stored in specifically allocated memory locations, the identity of the sensor associated with the sensor data is known, and accordingly, it is not necessary to store the sensor ID. Of course, the sensor ID could be stored if desired. For example, the sensor ID for a sensor may be stored only one time, and the sensor ID for subsequent samples may not be stored because the sensor data from the same sensor is contiguously stored in one location in memory. Additionally, the bit packed batched sensor data 140 may be compressed by storing only a single time stamp for each sensor, which is the time stamp associated with the first set of sensor data stored in the allocated memory. The time stamps associated with subsequent sensor data may not be stored, but can be easily recreated at the time of unpacking because the first sample time stamp is stored and the sample rate of the sensor data is known. Thus, the accelerometer data 142, the magnetometer data 144, and the gyroscope data 146 are each shown with only the first time stamp, even though each includes multiple sets of data. For example, the accelerometer data 142 shows only one 24 bit time stamp, stored in a 32 bit word, which is associated with the 9 bits of data for each axis X, Y, and Z for data sets [1], [2], [3], and [4]. Similarly, the magnetometer data 144 shows only one 24 bit time stamp, stored in a 32 bit word that associated with the 12 bits of data for each axis X', Y', and Z' for data sets [1], [2], and [3]. Similarly, the gyroscope data 146 shows only one 24 bit time stamp associated with the 16 bits of data for each axis X", Y", and Z" for data sets [1] and [2]. Additionally, while each time stamp is shown as being stored by itself in a 32 bit word, if desired, the sensor ID and/or the sensor data may be stored contiguously with each time stamp.

While data sets [1], [2], [3], and [4], are illustrated in the bit packed batched sensor data 140, it should be understood that additional or fewer data sets may be associated with the time stamp. Moreover, while the same data set identifiers, e.g., [1], [2], [3], and [4], are illustrated for each of the accelerometer data 142, magnetometer data 144, and gyroscope data 146, it will be understood that the data from the sensors may be collected at different times and at different sensor rates. Further, it should be understood that the number of bits is provided only by way of example.

Additionally, while the bit packed batched sensor data 140 in FIG. 4 illustrates the accelerometer data 142, magnetometer data 144, and gyroscope data 146 as stored separately, e.g., in different allocated sections of the batched memory 108, if desired, the data from the various sensors may be interleaved in a single sector of the batched memory 108, e.g., based on time of receipt. In an embodiment where data from multiple sensors is interleaved in a single sector of the batched memory 108, a sensor ID and a time stamp would be stored in the batched memory each time a data from a different sensor is being added to the batched memory 108.

As can be seen, the bit packed batched sensor data 140 is a considerably more efficient use of the batching memory 108 than if the data were not packed or compressed, e.g., as illustrated by raw data 40. For example, as illustrated by accelerometer data 42 in the raw data 40, a sensor data size of 9 bits, if written to a byte aligned memory, will require 2 bytes per sensor reading, resulting in wastage of 7 bits. Eight sensor readings will result in data that occupies 16 bytes. With the bit packer 106, however, the same eight sensor readings may be stored in 9 bytes, which is an approximate 43% savings in memory size and power requirements. Moreover, the bit packer 106 may be configurable to accommodate various sensor data sizes, by way of example, ranging from 9 to 15 bits.

For example, assuming the sensor ID is 5 bits, the time stamp is 24 bits, and the sensor data for the accelerometer is 9 bits, for the magnetometer is 12 bits, and for the gyroscope is 12 bits, a single packet or set of raw data will be 32 bit (or 4 bytes)*3 (for three axes) for data+32 bit (or 4 bytes) for time stamp+32 bit (or 4 bytes) for sensor ID=20 bytes if the data is not packed. Assuming the sensors operate at the same sampling rate, in 45 KB, each memory block will occupy 15 KB (15360 bytes) so that 768 packets or data sets of unpacked data for each sensor can be stored. If the sensor data is packed and compressed, then 768 packets or sets will be: accelerometer=32 bit (or 4 bytes) for time stamp+768*9 bits*3 (for three axes), for a total of 2596 bytes and magnetometer and gyroscope=32 bit (or 4 bytes) for time stamp+768*12 bits*3 (for three axes) for a total of 3460 bytes. The savings in memory size and power consumption based on the above assumptions is provided in Table 1 below.

TABLE 1

| | Memory Size in bytes | | | Power Consumption in µA for the memory | | |
|---|---|---|---|---|---|---|
| | Without Packing | With Packing | Savings | Without Packing | With Packing | Notes |
| Accel 9 bits | 15360 | 2596 | 591.68% | 1.40625 | 0.237671 | Typical, 32k SRAM bank leakage ~3 µA |
| Mag 12 bits | 15360 | 3460 | 443.93% | 1.40625 | 0.316772 | |
| Gyro 12 bits | 15360 | 3460 | 443.93% | 1.40625 | 0.316772 | |

Thus, from Table 1, it can be seen that there is a significant savings in packing and compressing the sensor data. For example, the accelerometer with 9 bits has a saving of approximately 1.17 µA, while the magnetometer and gyroscope, each with 12 bits, has a savings of approximately 1.09 µA, for an averages savings of 3.35 µA for a three sensor batching memory. By way of comparison, a typical 32 K SRAM bank has a leakage of approximately 3 µA.

Figure 5:
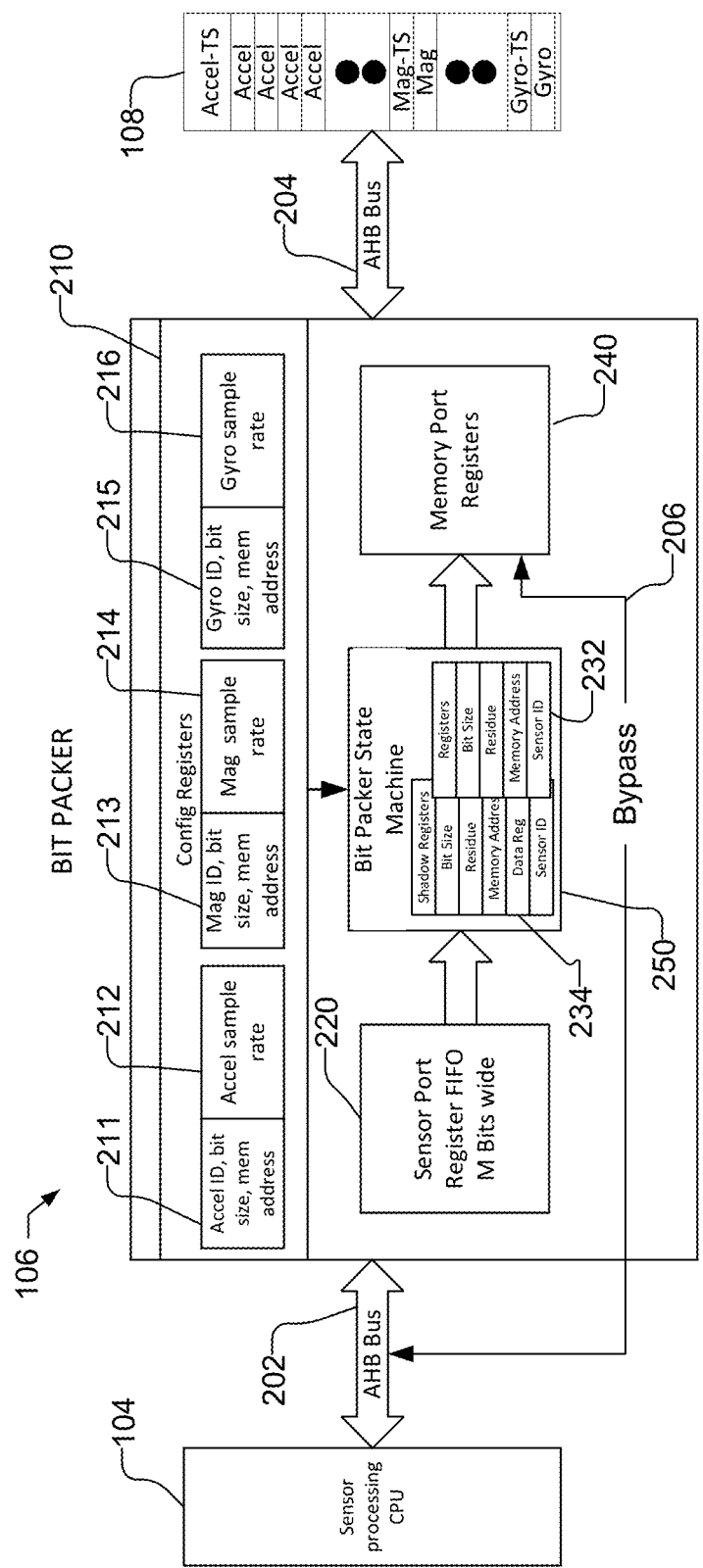
FIG. 5 illustrates a logic diagram of a bit packer that may be used in the sensor hub.

FIG. 5 illustrates a logic diagram of the bit packer 106. The bit packer 106 may be a hardware unit in the sensor hub 100. As illustrated, the bit packer 106 communicates with the sensor processing CPU 104, e.g., via a bus 202, which may be, e.g., an AHB (AMBA High Performance Bus) based on AMBA (Advanced Microcontroller Bus Architecture) or any other suitable bus. The bit packer 106 includes configuration registers 210, which store the configuration parameters for the sensors 20. For example, as illustrated, configuration registers 211 and 212 store parameters for the accelerometer 22, with configuration register 211 storing the accelerometer ID (Accel ID), the bit size for the axes for the sensor, and the memory address (mem address), which is the memory address for the allocated memory in batching memory 108, and with configuration register 212 storing the sample rate of the accelerometer. Similarly, configuration registers 213 and 214 store parameters for the magnetometer 24, with configuration register 213 storing the magnetometer ID (Mag ID), the bit size for the axes, and the memory address (mem address), and with configuration register 214 storing the sample rate for the magnetometer. Configuration registers 215 and 216 are illustrated as storing parameters for the gyroscope 26, with configuration register 215 storing the gyroscope ID (Gyro ID), the bit size for the axes, and the memory address (mem address), and with configuration register 216 storing the sample rate of the gyroscope. If additional sensors are used, the configuration registers 210 would include additional registers to store the configuration parameters for the additional sensors. The configuration registers 210 may be configurable so that the certain or all configuration parameters, such as the sampling rate, may be updated as necessary. For example, the configuration registers 210 may appear as memory mapped registers to the sensor processing CPU 104 and may be configured/written to by the system software at the time of boot/initialization.

The bit packer 106 further includes a sensor port register 220 and memory port registers 240. The sensor port register 220 may be, e.g., a FIFO (first in, first out) register that is M bits wide, which is the same width as the batching memory 108. The memory port registers 240 are also M bits wide. The sensor port register 220 receives the sensor data from the bus 202 and provides the sensor data to memory port registers 240, as controlled by the bit packer state machine 250. As can be seen, the bit packer state machine 250 includes state registers including the working register 232, which hold the state of the sensor that is currently being processed and one or more shadow registers 234, which hold the states for sensors that were previously processed. The working register 232 and shadow registers 234 store the bit size, which is the number of data bits per axis for the sensor, the residue, which is the location within a word to be written to for the sensor, and the memory address, which is the location of the next word to be written to in batch memory for the sensor. The shadow registers further store the data register and the sensor ID. Shadow registers exist, for example, so that if the sensor data arrives interleaved, the current state of a first type of sensor data (e.g., accelerometer) being packed may be preserved and bumped out to be stored in the data registers when a second type of sensor data (e.g., gyroscope) is to be packed, and the first type of sensor data may be restored after the second type of sensor data is finished being packed.

The bit packer state machine 250 controls the flow of sensor data to the memory port registers 240. The bit packer state machine 250 causes the sensor data to be received in the memory port registers 240 so that the measured data is contiguous, as opposed to having each axis of the measured data stored in a different M bit wide word. Additionally, the state machine 250 may compress the sensor data, e.g., by removing the sensor ID and/or the time stamp in a set of sensor data. For example, the sensor ID may be removed from all sets of sensor data, and the time stamp may be removed from all but the first set of sensor data. The memory port registers 240 communicate with the batching memory 108 via the bus 204, which may be an AMBA bus or AHB bus, or any other suitable bus.

Figure 6:
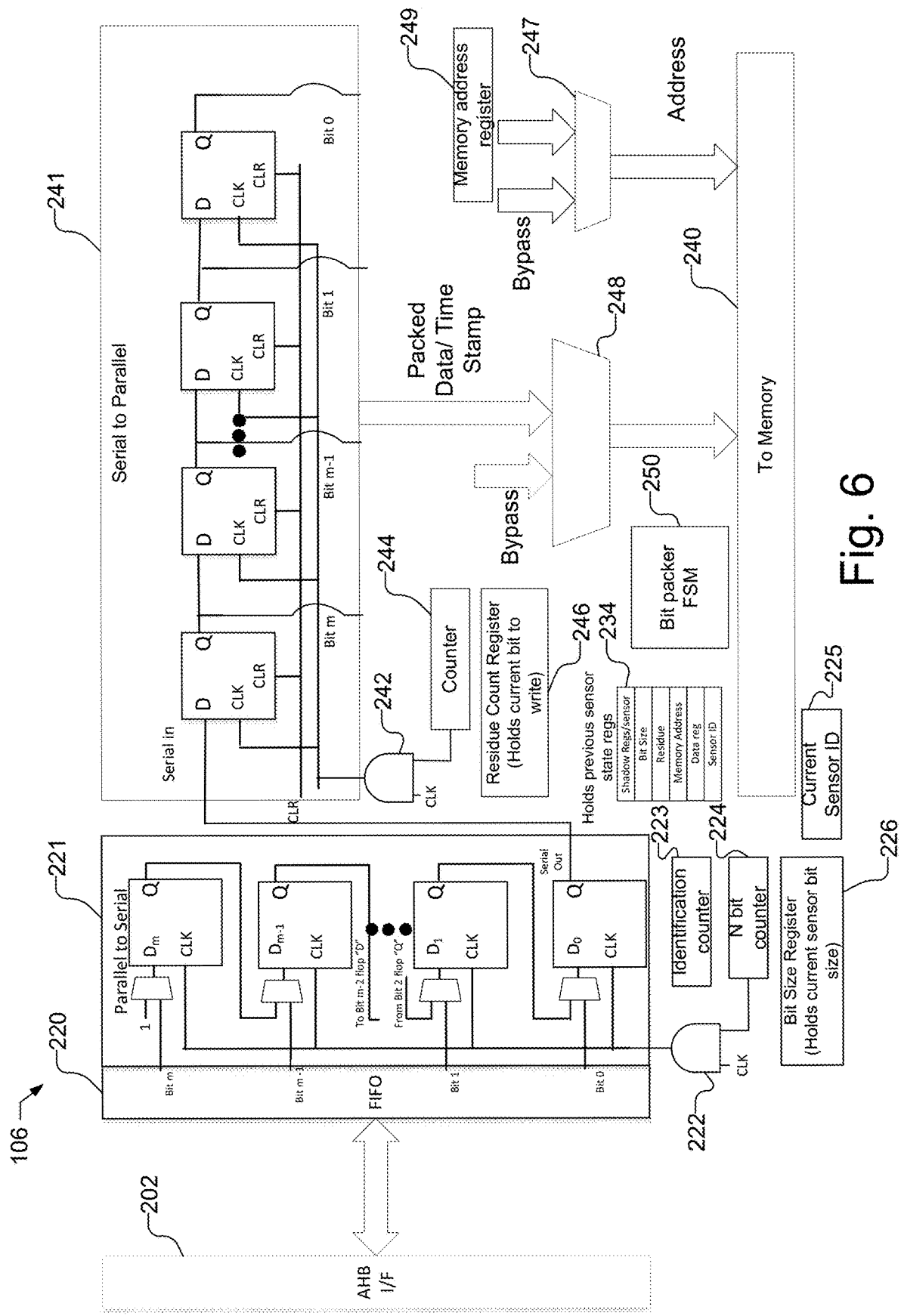
FIG. 6 illustrates a circuit diagram of a bit packer that may be used in the sensor hub.

The bit packer 106 and unpacker 112 may be configurable to be bypassed on demand. The bit packer 106 and unpacker 112 may need to be reset (or flushed) before being placed in bypass mode. The bypass mode in the bit packer 106 simply sends the sensor address and data bus to the memory port registers 240, e.g., through a mux selectable through a register bit in the general configuration register (as illustrated in FIG. 6). The bypass is illustrated in FIG. 5 by line 206 between bus 202 and memory port registers 240 that allows the sensor data to bypass the sensor port register 220 and the bit packer state machine 250. When the bit packer 106 is bypassed, the bit unpacker 112 will likewise by bypassed.

FIG. 6 illustrates a circuit diagram of the bit packer 106, including the bit packer finite state machine 250. As illustrated, the bus 202 that interfaces with the sensor processing CPU 104 is coupled to the sensor port register 220, which is an M bits wide FIFO register. The sensor port register 220 is coupled to a parallel-in to serial-out shift register 221 that includes D-Type data latches for each data bit, 0-*m* received from the sensor port register 220. The data latches of shift register 221 are daisy-chained together so that the output Q from one becomes the input D to the next. As illustrated, the input D of each data latch is multiplexed with sensor data from the sensor port register 220 and the output Q from a preceding data latch. The sensor data is received from sensor port register 220 in parallel format, so that when selected by the multiplexors, all the data bits enter input D of the data latches at the same time. The multiplexors are controlled so that after the sensor data enters input D of the data latches from sensor port register 220, the output Q from preceding data latches is then selected by the multiplexors so that the sensor data is read out sequentially at Serial Out. The multiplexors are controlled by the N bit counter 224 which counts down from the number of bits in the word of sensor data based on the bit size register 226, which holds the current sensor bit size. After all of the sensor data has been read out, the N bit counter 224 causes the multiplexors to select the next word of sensor data from sensor port register 220 to be entered into input D of the data latches at the same time. Thus, consecutive words of sensor data are output by shift register 221 as a single serial data stream. This sensor data is output one bit at a time on each clock cycle in a serial format. The clock input CLK of the data latches are controlled by a CLK signal that is AND gated 222 with the N bit counter 224. The N bit counter 224 controls the clock input CLK so that when a new word of sensor data from sensor port register 220 can be selected by the multiplexors to be entered into input D of the data latches at the same time.

In addition, the multiplexors at the input D of the data latches may be controlled by the N bit counter 224 to compress the sensor data by removing the sensor ID and/or the time stamp in the sensor data received from the sensor port register 220. For example, the sensor ID may be removed from all sets of sensor data by simply not selecting the sensor data to be read into the data latches when a current word includes the sensor ID. Similarly, the time stamp may be removed from all, but the first set of sensor data by simply not selecting the sensor data to be read into the data latches when a current word includes a time stamp. For example, an identification counter 223 may be used to identify the sensor ID and the time stamp. Identification counter 223, for example, counts from "0" to "4" and rests back to "0," where count "0" indicates sensor ID, count "1" indicates the time stamp, and the remaining counts indicate sensor data. The "0" and "1" counts from the identification counter 223 may be used as a gating signal to N bit counter 224 so that the sensor ID and time stamp are removed from the sets of sensor data. When the sensor data is the first set of data for a particular sensor that is being batched to batching memory, the time stamp may be parallel input to the data latches and read serially out as discussed above. The time stamp may be written as a single word [M bits]. The N bit counter 224 thus may be initialized with M bits by the bit packer state machine 250 and once the time stamp is shifted, the bit packer state machine 250 loads the N bit counter 224 from the configurable register 210 for the appropriate sensor data size.

The serial output of the shift register 221 is coupled to be received as the input of a serial-in to parallel-out shift register 241 that includes D-Type data latches for each data bit for the sensor. The data latches include a clear input to clear any previously latched data when a new word is processed. As illustrated, the output of each data latch is provided as an input to the next data latch at each clock signal. The clock input CLK of the data latches in shift register 241 are controlled by a CLK signal that is AND gated 242 with a counter 244. The counter 244 causes the serial input data to be shifted down to the appropriate data latch. The counter 224 is controlled by residue count register 246, which holds the current bit to be written to within the memory word for the sensor. Typically, the counter 224 will cause the sensor data to be shifted down so that the data is aligned with bit 0. However, when the data being processed is from a different sensor, e.g., the immediately preceding set of sensor data was from the magnetometer and the current set of sensor data is from the accelerometer, and when data has already been stored in the batching memory for the current sensor, the counter 224 will cause the sensor data from the data register in the shadow register 234 to be shifted down until the new sensor data is to be written based on the residue count register 246.

Once the sensor data is finished being shifted in shift register 241, as controlled by counter 244, the now M bit word of packed data or a time stamp, e.g., if it is the first set of data for a particular sensor, is provided to the memory port register 240 via the multiplexor 248. The memory address as provided by the memory address register 249 is also provided to the memory port register 240 via multiplexor 247. The memory address is the location in batching memory that the word of sensor data from a sensor is to be stored.

As illustrated, the multiplexor 248 may also receive bypass data, which is the sensor data from the bus 202 and multiplexor 247 receives a bypass memory address. Thus, multiplexors 248 and 247 may be used to enable the sensor data to bypass bit packing.

When there is a change in sensor ID, i.e., the sensor ID in sensor port register 220 is from a different sensor relative to the immediately preceding sensor, the N bit counter 224 causes the shift register 221 to stop providing serial data until the shift register 241 finishes shifting down the last word of data, which is provided to the memory port register 240. The parameters of the current registers, e.g., the bit size register 226, residue 246, and memory address register 249, are stored in the appropriate shadow registers 234, and the register parameters for the new sensor, e.g., stored in shadow registers 234 or in the configurable register 210 (if it is the first set of data for the new sensor), are uploaded to the bit size register 226, residue 246, and memory address register 249, and the sensor data (or time stamp) from the new sensor is read into the shift register 221. Each first word (corresponding to the sensor ID) read into shift register 221, as identified by the identification counter 223, is compared to the current sensor ID stored in register 225. If the sensor ID in the shift register 221 does not match the current sensor ID, then the data from the bit size register 226, residue count register 246, memory address register 249, shift register 241 (i.e., all of bits 0-m), and sensor ID register 225 are stored in the shadow register 234; and the data from the appropriate shadow register 234, i.e., from the shadow register with a matching sensor ID, is restored to registers 226, 246, 249, 241, and 225. The data from the data register in the shadow register 234 is read into shift register 241 and the new data from shift register 221 is inserted into the data at the appropriate bit as controlled by the residue count register 246.

Figure 7:
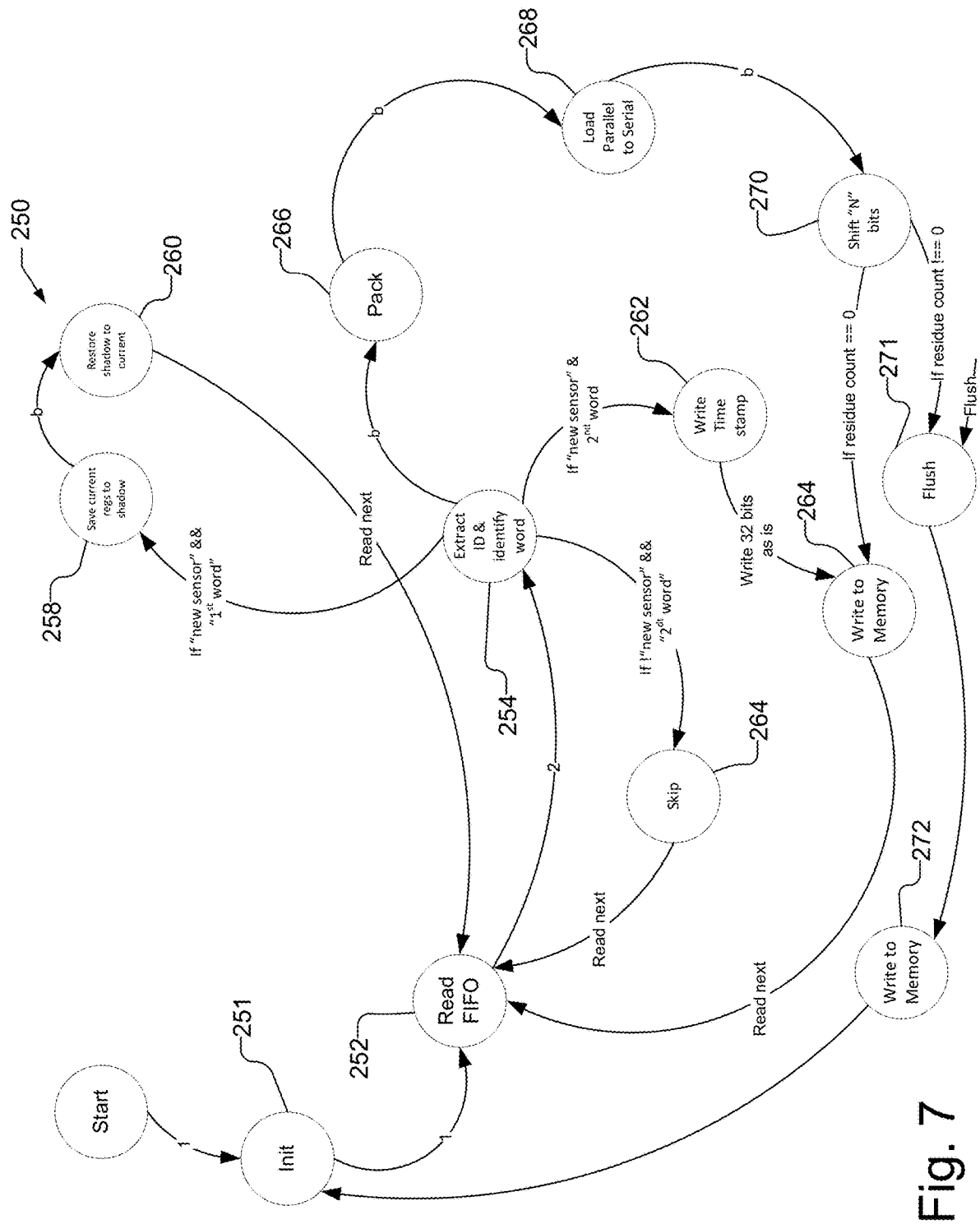
FIG. 7 is a graph illustrating an embodiment of the bit packer state machine for a bit packer that may be used in the sensor hub.

FIG. 7 is a graph illustrating an embodiment of the bit packer state machine 250. The state machine 250 may be implemented in the form of a hardware logic network of any kind in the bit packer 106, illustrated in FIGS. 5 and 6. In the initiation (Init) state 251, the configurable registers 210 shown in FIG. 5 are read into the state machine 250, e.g., by being written to shadow registers 234. At the read FIFO state 252, the sensor data at the sensor port register 220 is read by the hardware logic network that is implementing the bit packer state machine 250. At state 254, the sensor ID, if present, is extracted and it is determined if the sensor data is from a "new sensor," i.e., the sensor ID does not match the sensor ID in current sensor ID 225, which may be case if it is the first sensor data being read into the bit packer, e.g., after startup, or if the new sensor data is from a sensor that is different from the sensor whose data is currently being packed by bit packer 106. Additionally, at state 254, the number of the word in the set of sensor data is identified, e.g., the first word corresponds to the sensor ID, the second word in sensor data set corresponds to the time stamp, and the third, fourth, and fifth words correspond to sensor data from different axes. If the sensor ID is new, i.e., the sensor data is from a "new sensor" and the first word is identified, then the state machine goes to state 258, in which the current registers are saved to the shadow registers 234, if appropriate (i.e., it is not the first sensor data being bit packed after startup, and then to state 260 in which the configuration for the sensor, e.g., bit size, residue, memory address associated with the sensor ID, data register and sensor ID are loaded into the current register 232 (FIG. 5) from the shadow registers 234. The state machine 250 does not write the first word to memory but returns to the read FIFO state 252 to read the next word.

If in state 254, it is determined from the data read from the read FIFO state 252, that it is the second word of data, i.e., the time stamp, from a "new sensor" then the state machine goes to state 262, in which the time stamp is loaded and written to memory at state 264. The time stamp may be written in a full word of memory, e.g., 32 bits, even if the size of the time stamp is less than a word of memory. The state machine 250 then returns to the read FIFO state 252 to read the next word.

If in state 254, it is determined from the data read from the read FIFO state 252, that it is the second word of data, i.e., the time stamp, but it is not from a "new sensor," then the state machine goes to state 264 in which writing of the second word is skipped and the state machine returns to the read FIFO state 252 to read the next word.

If in state 254, it determined that the data read from the read FIFO state 252 is not a first word or a second word, the state machine goes to the pack state 266. From the pack state 266, the state machine 250 goes to the load parallel to serial state 268 in which the sensor data from the read FIFO state 252 is loaded into shift register 221. At the shift "N" bits state 270, the data is shifted out of the shift register 221, e.g., using N bit counter 224. At the write to memory state 264, the data is written to the batching memory 108, e.g., using the shift register 241 and multiplexor 248, if the residue count is zero. The state machine 250 then returns to the read FIFO state 252 to read the next word of sensor data. The state machine 250 continues to cause the sensor data to be packed and written to the batched memory 108 until the read sensor data is a first word with a new sensor ID, at which time the state machine 250 goes to state 256 or 258, as discussed above. Thus, the sensor data is written to the batching memory 108, as illustrated by bit packed batched sensor data 140 in FIG. 4.

If at state 270, the residue count is not zero, but an external "flush" signal is received, e.g., from the sensor processing CPU 104 (FIG. 3), the state machine 250 goes to a flush state 271, in which the data is written to memory at state 272. The bit packed batched data is read out and the state machine 250 returns to initiation (Init) state 251. The external "flush" signal may be provided, e.g., if the batching memory 108 is full, if a new sensor is to be batched (i.e., a sensor that is not being batched in the current batching process is to be added to the batching process), or if the sensor data is requested from an radio and/or application processor of the electronics device.

Figure 8:
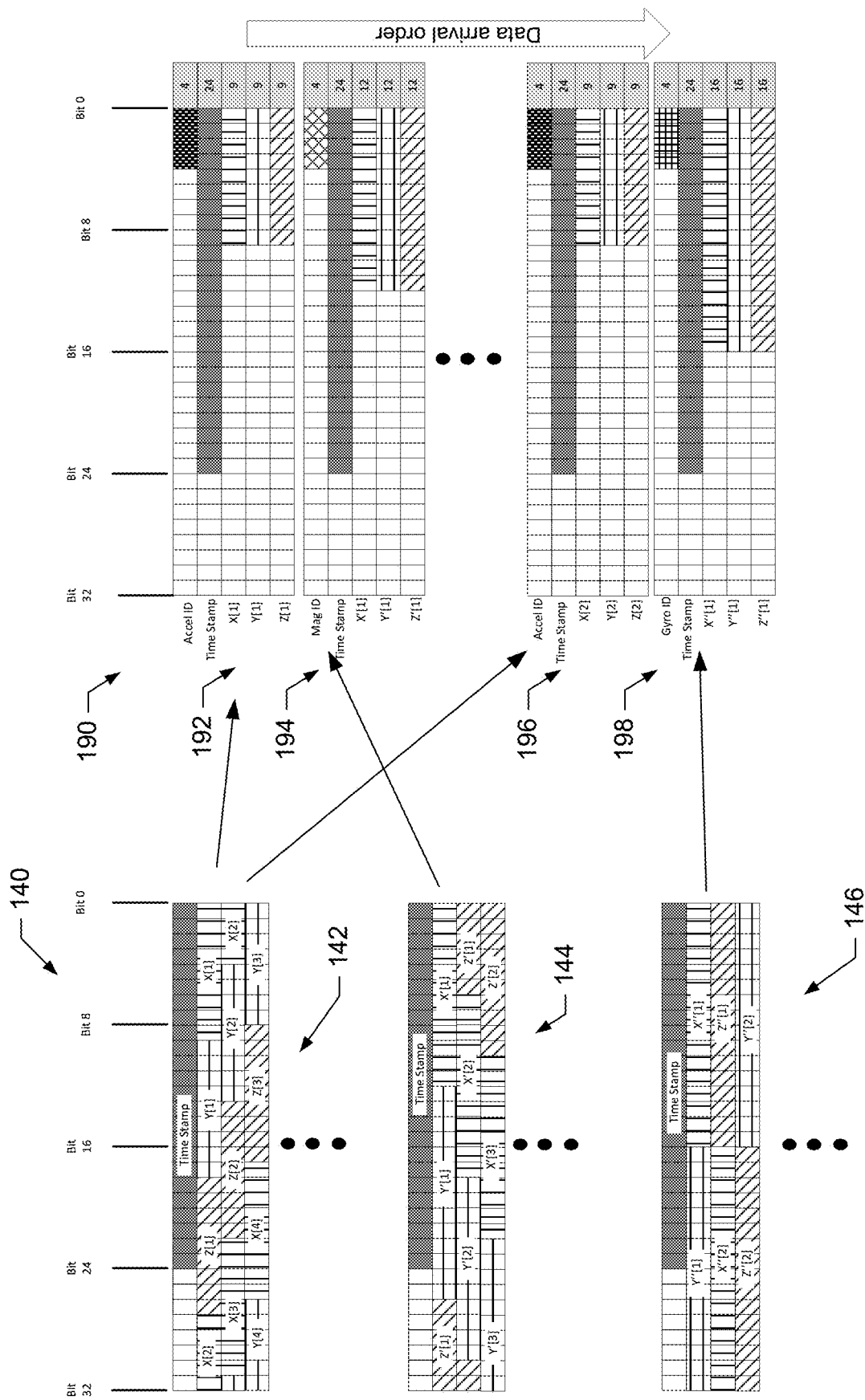
FIG. 8 illustrates the regenerated sensor data after bit packed batched sensor data is unpacked.

The bit unpacker 112, illustrated in FIG. 3, receives the bit packed batched data 110 from the batching memory 108 and unpacks the bits of the sensor data to regenerate the sensor data. FIG. 8, by way of example, illustrates the bit packed batched sensor data 140 stored in batching memory 108 that is unpacked by bit packer 112 to produce the regenerated sensor data 190, which may be provided to the appropriate radio and/or application processor of the electronics device via the AP interface 114 in FIG. 3. By regenerating the sensor data from the bit packed batched data 110, the bit unpacker 112 produces the regenerated sensor data 190 in the same form and the same arrival order as if the batched data had not been packed, i.e., similar to the raw data 40, discussed in FIG. 4. Thus, FIG. 8 illustrates the regenerated sensor data 190 as including the data from the three axis sensors 20, e.g., accelerometer 22, magnetometer 24, and gyroscope 26. The sensor ID, time stamp and each axis of the measured data is stored in a different M bit wide word. Thus, as can be seen, the data 192 and 196 from accelerometer are illustrated as including separate 32 bit words for each of the three axes (X, Y, and Z), as well as the accel ID, and time stamp. Additionally, regenerated sensor data 190 may be decompressed so that the sensor ID and/or time stamp is reinserted into each new set of sensor data. For example, as can be seen, the accel ID and time stamp is included in each of the data sets [1] and [2] in data 192 and 196. The data 194 and 198 for the magnetometer and gyroscope, respectively, similarly will include separate 32 bit words for each of the three axes, as well as the sensor ID and time stamp associated with each time unit.

Figure 9:
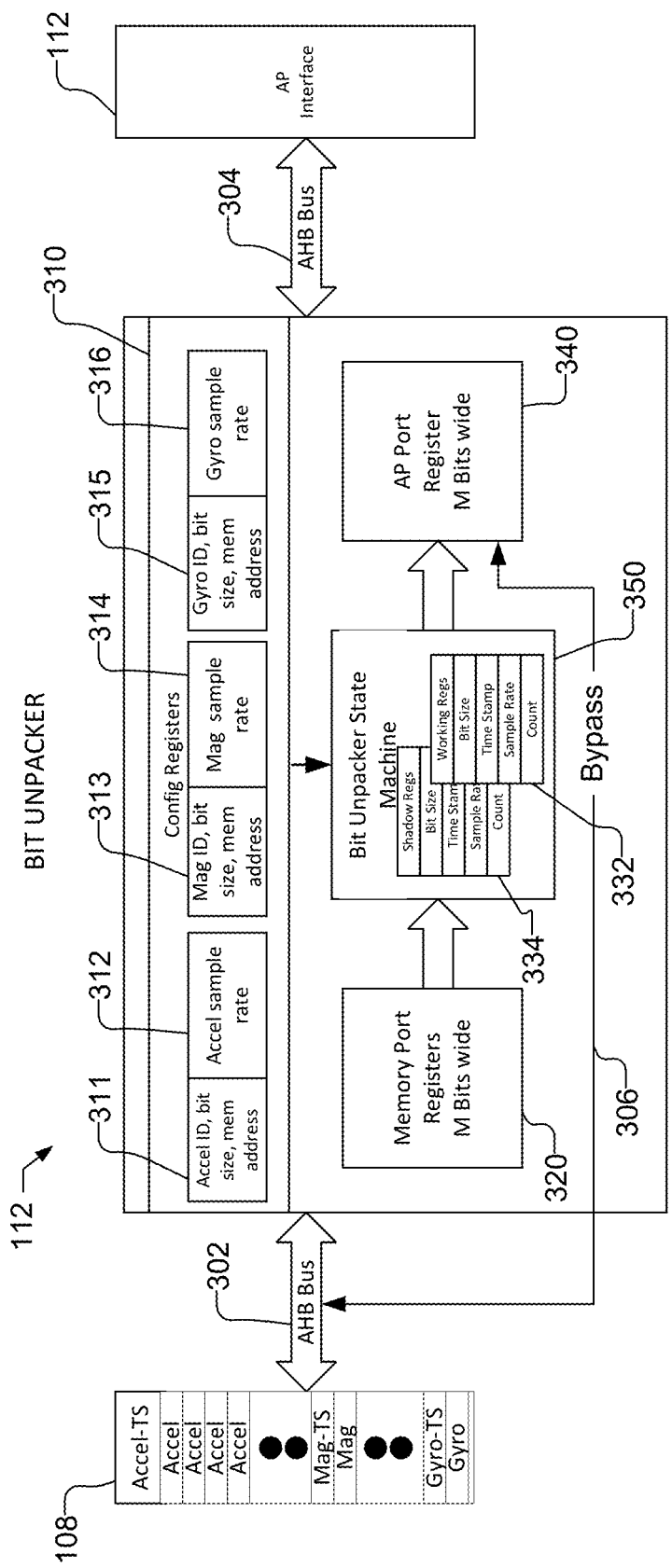
FIG. 9 illustrates a logic diagram of a bit unpacker that may be used in the sensor hub.

FIG. 9 illustrates a logic diagram of the bit unpacker 112. The bit unpacker 112 may be a hardware unit in the sensor hub 100. As illustrated, the bit unpacker 112 communicates to receive the bit packed batch data from the batching memory 108 via a bus 302, which may be an AMBA bus or AHB bus, or any other suitable bus. Similar to bit packer 106, the bit unpacker 112 includes configuration registers 310, which store the configuration parameters for the sensors 30. For example, as illustrated, configuration registers 311 and 312 store parameters for the accelerometer 32, with configuration register 311 storing the accelerometer ID (Accel ID), the bit size for the axes, and the memory address (mem address), and with configuration register 312 storing the sample rate of the accelerometer. Similarly, configuration registers 313 and 314 store parameters for the magnetometer 34, with configuration register 313 storing the magnetometer ID (Mag ID), the bit size for the axes, and the memory address (mem address), and with configuration register 314 storing the sample rate for the magnetometer. Configuration registers 315 and 316 are illustrated as storing parameters for the gyroscope 36, with configuration register 315 storing the gyroscope ID (Gyro ID), the bit size for the axes, and the memory address (mem address), and with configuration register 316 storing the sample rate for the gyroscope. If additional sensors are used, the configuration registers 310 would include additional registers to store the configuration parameters for the additional sensors. The configuration registers 310 may be configurable so that the certain or all configuration parameters, such as the sampling rate, may be updated as necessary. For example, the configuration registers 310 may appear as memory mapped registers to the sensor processing CPU 104 and may be configured/written to by the system software at the time of boot/initialization. If desired, the configuration registers 310 of the bit unpacker 112 may be the same registers used in the configuration registers 210 of the bit packer 106, shown in FIG. 5.

The bit unpacker 112 further includes memory port registers 320 and AP port register 340. The memory port registers 320 are M bits wide. The memory port registers 320 receive the bit packed batched sensor data from the batching memory 108, via the bus 302. The memory port registers 320 provides the sensor data to the AP port register 340, as controlled by the bit unpacker state machine 350. As can be seen, the bit unpacker state machine 350 includes state registers including the working register 332, which hold the state of the sensor that is currently being processed and one or more shadow registers 334, which hold the states for sensors that were previously processed. The working register 332 and shadow registers 234 store bit size of the sensor data, the time stamp, sample, rate, and count, which is the number of data sets between a current data set and the first data set that included the time stamp. The bit unpacker state machine 350 controls the flow of sensor data to the AP port register 340 that is M bits wide. For example, the state machine 350 causes the bit packed batched data to be unpacked so that each axis of the measured data is stored in a different M bit wide word. Additionally, the state machine 350 may cause the bit packed batched data to be decompressed, e.g., by reinserting the sensor ID and/or time stamp in each new set of sensor data. For example, when there are multiple consecutive data sets from a single sensor, the time stamp may be reinserted in each data set, based on the time stamp for the first data set, as well as the sample rate for the sensor and the count of the number of the data sets between the first data set and the current data set. The AP port register 340 communicate with the AP interface 114, via the bus 304, which may be an AHB bus or any other suitable bus.

As discussed above, the bit packer 106 and unpacker 112 may be bypassed on demand, which may require resetting (or flushing) the bit packer 106 and unpacker 112 prior to being placed in bypass mode. The bit unpacker 112 will be bypassed if the bit packer 106 is bypassed. The bypass for the bit unpacker 112 is illustrated in FIG. 9 by line 306 between bus 302 and AP port register 340 that allows the sensor data to bypass the memory port registers 320 and the bit unpacker state machine 350 so that the address and the data bus is sent directly to a mux in front of the AP Port Register 340 (as illustrated in FIG. 10).

Figure 10:
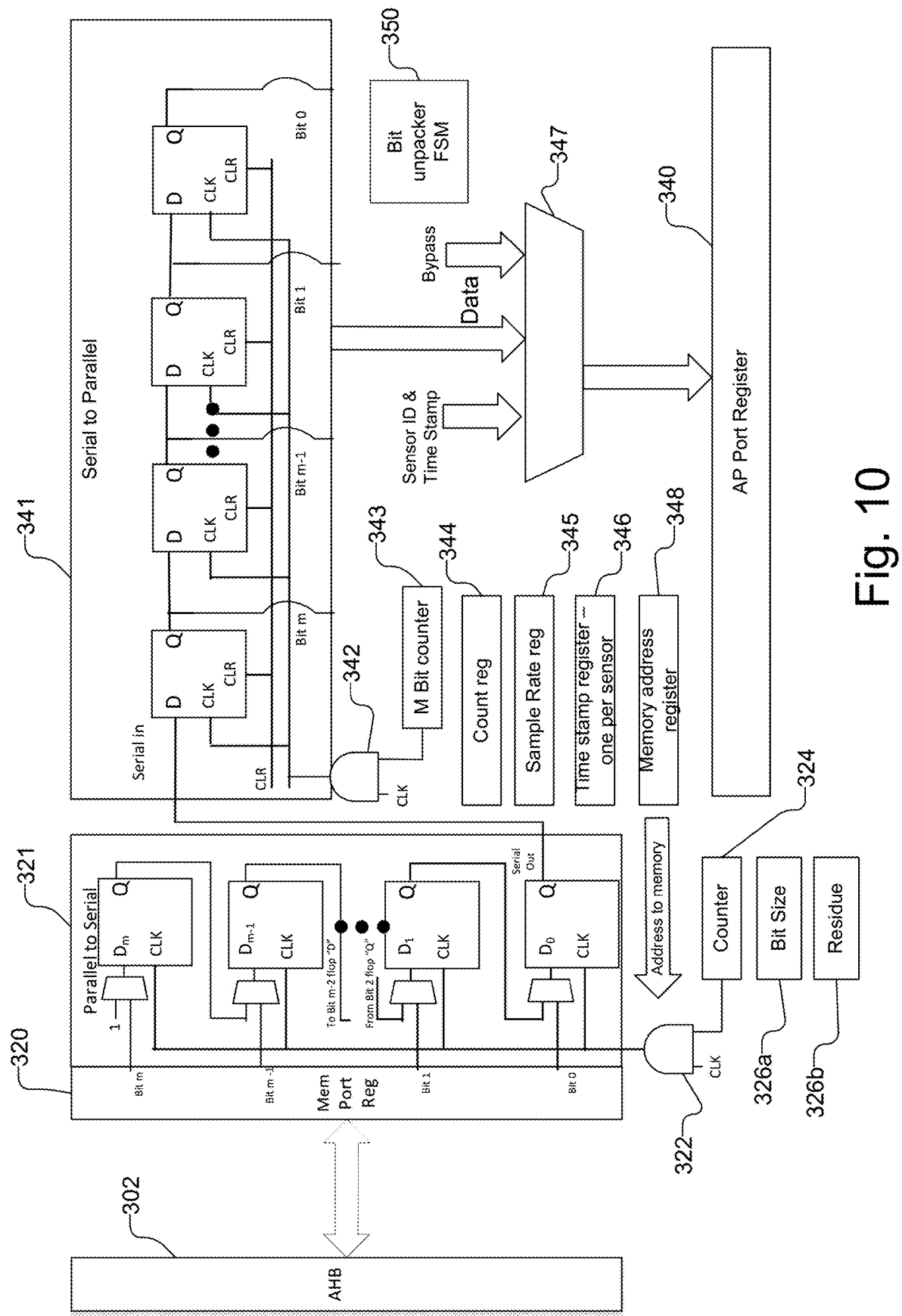
FIG. 10 illustrates a circuit diagram of a bit unpacker that may be used in the sensor hub.

FIG. 10 illustrates a circuit diagram of the bit unpacker 112, including the bit unpacker finite state machine 350. As illustrated, the bus 302 that interfaces with the batching memory 108 is coupled to the memory port register 320, which is M bits wide. The memory port register 320 provides to the bus 302 the memory address for the current set of data to be read out of batching memory 108. The current set of data to be read out of batching memory 108 is determined based on the sample rates of the sensors stored in sample rate registers 345, as well as the number of sets of sensor data for each sensor that have been read out of batching memory 108 as stored in count register 344. For example, if the accelerometer has a sampling rate of 50 Hz and the magnetometer and gyroscope each have a sampling rate of 10 Hz, then there will be 5 accelerometer data sets that are read out of batching memory 108 before 1 magnetometer data set and 1 gyroscope data set are read out of batching memory 108. Accordingly, the sensor data is read out of the batching memory 108 in the same order that the raw sensor data arrived at the bit packer 106, even though the bit packed batched data is stored in regions of the batching memory 108 that are allocated by sensor.

The memory port register 350 is coupled to a parallel-in to serial-out shift register 321 that includes D-Type data latches for each data bit, 0-m received from memory port register 320. The data latches are daisy-chained together so that the output Q from one becomes the input D to the next. As illustrated, the input D of each data latch is multiplexed with data from the memory port register 320 and the output Q from a preceding data latch. The data is received from memory port register 320 in parallel format so that, when selected by the multiplexors, all the data bits enter input D of the data latches at the same time. The multiplexors are controlled so that after the data enters input D of the data latches from memory port register 320, the output Q from preceding data latches is then selected by the multiplexors so that the data is read out sequentially at Serial Out. The multiplexors are controlled by the counter 324 which counts down from the number of bits in the word of sensor data based on the bit size, residue and count from registers 326a and 326b for the current sensor data being processed. For example, bit size register 326a provides the bit size of the data for the sensor being processed, while the residue register 326b provides location within a word that the sensor data begins, e.g., when there is a change in the sensor data being processed. After all of the desired data has been read out, e.g., as determined by the bit size, residue and count registers 326a and 326b the counter 224 causes the multiplexors to select the next word of data from memory port register 320 to be entered into input D of the data latches at the same time. Thus, consecutive words of data are output by shift register 221 as a single serial data stream. This data is output one bit at a time on each clock cycle in a serial format. The clock input CLK of the data latches are controlled by a CLK signal that is AND gated 222 with the counter 324. The counter 324 controls the clock input CLK so that when a new word of sensor data from memory port register 320 can be selected by the multiplexors to be entered into input D of the data latches at the same time.

The serial output of the shift register 321 is coupled to be received as the input of a serial-in to parallel-out shift register 341 that includes D-Type data latches for each data bit for the sensor. The data latches include a clear input to clear any previously latched data when a new word is processed. As illustrated, the output of each data latch is provided as an input to the next data latch at each clock signal. The clock input CLK of the data latches in shift register 341 are controlled by a CLK signal that is AND gated 342 with an M bit counter 343, which causes the serial input data to be shifted to the end to align with bit 0. Once the data is finished being shifted M latches, as controlled by M bit counter 343, the multiplexor 347 provides the data to the AP port register 340. As illustrated, the multiplexor 347 may also select the sensor ID and time stamp to insert the sensor ID and time stamp into the data provided to the AP port register 340.

Figure 11:
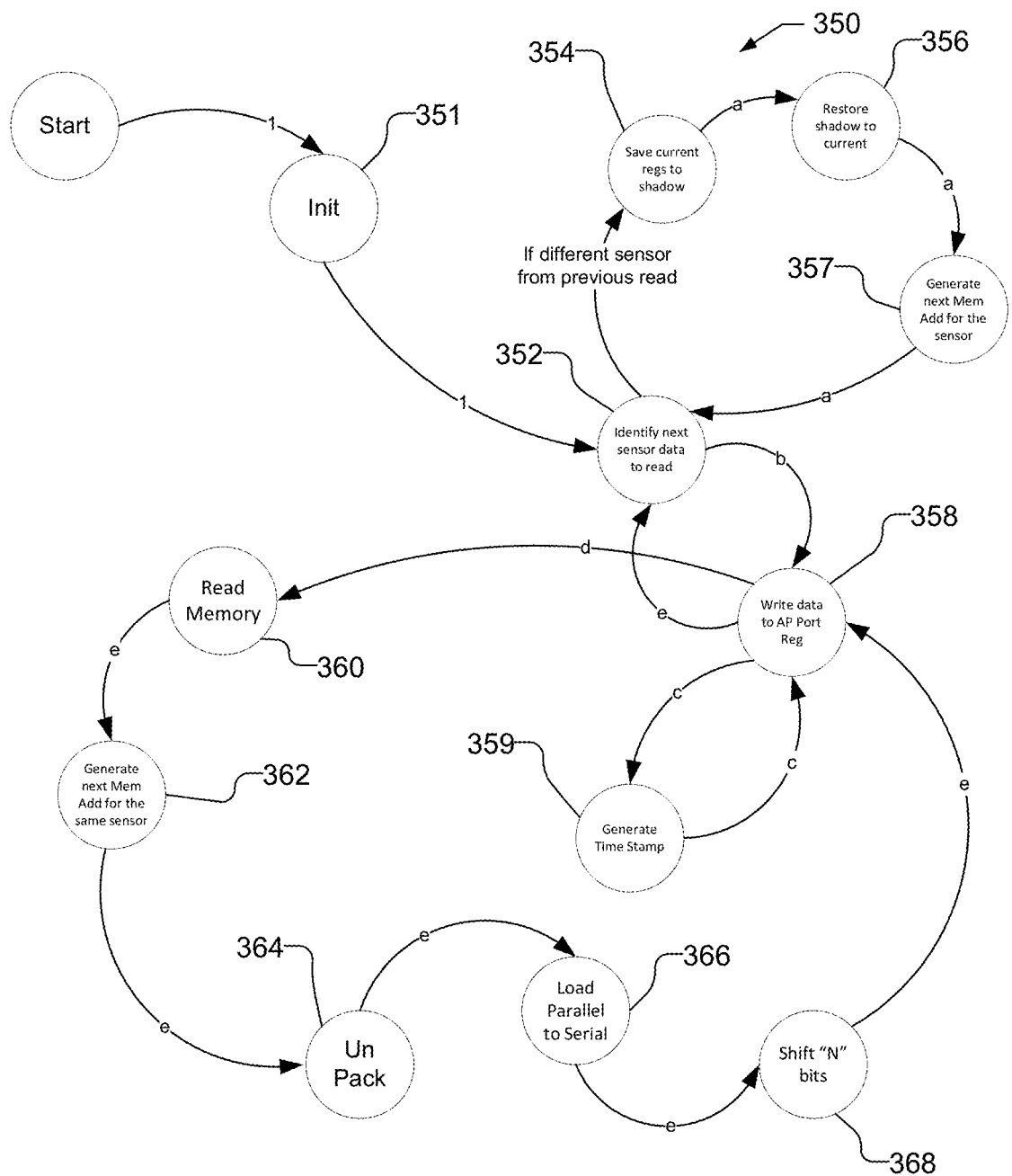
FIG. 11 is a graph illustrating an embodiment of the bit unpacker state machine for a bit unpacker that may be used in the sensor hub.

FIG. 11 is a graph illustrating an embodiment of the bit unpacker state machine 350. The state machine 350 may be implemented in the form of a hardware logic network of any kind in the bit unpacker 112, illustrated in FIGS. 9 and 10. In the initiation (Init) state 351, the configurable registers 210 shown in FIG. 5 are read into the state machine 350, e.g., by being written to shadow registers 334.

The next sensor data to be read, i.e., the sensor ID for the next sensor data, is determined at state 352. The next sensor data to be read is determined based on the known sampling rates of the sensors. By way of example, if the sampling rates for the accelerometer (A) is 50 Hz, the gyroscope (G) is 10 Hz, and the magnetometer is 5 Hz, then the read order is A,A,A,A,A,G,A,A,A,A,A,G,M,A,A,A,A,A,G,A,A .... If state 352 determines that the next sensor to be read is different from the previous read, e.g., the next sensor is the first sensor being read or the sensors are changing, then the state machine 350 goes to state 354 in which the current registers are saved to the shadow registers 334, if appropriate (i.e., it is not the first sensor data being bit unpacked after startup, and then to state 356 in which the configuration for the next sensor, e.g., bit size, residue, sample rate, count, are loaded into the current registers 332 (FIG. 9) from the shadow registers 334. Thus, each time the data from a different sensor is to be unpacked, i.e., a different memory region in batching memory 108 is to be unpacked, the reconfiguration of the registers occurs, including saving current register settings in the shadow registers (state 354) and restoring the next register settings from the shadow registers (state 356). The state machine 350, thus, generates the next memory address at state 357, accordingly.

The sensor ID from state 352 is written to the AP port register 340 at state 358. The time stamp is then generated at state 359. For example, if the time stamp is included in the bit packed batched sensor data, e.g., if the data is the first set of data read from batching memory 108 for the current sensor, then the time stamp may be read from the bit packed batched sensor data itself and the time stamp register 346 in FIG. 10 is updated to store the time stamp. In subsequent sets of data for the sensor, the time stamp may be generated based on the time stamp stored in time stamp register 346, as well the sample rate as stored in the sample rate register 345 in FIG. 10, and count of how many sets of data associated with the sensor have been read as stored in the count register 344 in FIG. 10. For example, the current data set may be the $n^{th}$ set of data for the sensor as stored in the count register 344, the initial time stamp stored in time stamp register 346 may be t, and the sample rate as stored in the sample rate register 345 may be f, which may be stored as the number of clock ticks, e.g., if the sample rate is 50 Hz (20 ms), for a 1 ms time the sample rate register 345 will contain f=20, then the time stamp associated with the current data set that is generated at state 359 would be t+(n−1)f.

The bit packed batched sensor data from batched memory 108 is then read into the memory port register 320 in state 360 based on the next memory address from the memory address register 348 and the next memory address is generated and stored in the memory address register 348 at state 362. The state machine 350 goes to unpack state 364 to unpack the bit packed batched sensor data. From the unpack state 364, the state machine 350 goes to the load parallel to serial state 366 in which the sensor data from the memory port register 320 is loaded into shift register 321. At the shift "N" bits state 368, the serial data is shifted in shift register 341 to align with the 0 bit, e.g., using M bit counter 341. The data is then written to the AP port register 340 at state 358. The state machine 350 then returns to state 352 to determine the next sensor data to be read.

Thus, in an embodiment, a sensor hub includes a means for interfacing with sensors that is configurable to be coupled to receive sensor data from a plurality of sensors, which may be, e.g., the sensor manager 102, shown in FIG. 3. A means for bit packing sensor data received from the plurality of sensors to generate bit packed sensor data, may be the bit packer 106, as discussed in reference to FIGS. 2-7. A means for batching and storing the bit packed sensor data may be, e.g., the batching memory 108 shown in FIG. 3. A means for bit unpacking the bit packed sensor data to regenerate the sensor data may be the bit unpacker 112, as discussed in reference to FIGS. 2 and 8-11. A means for interfacing with an application processor that is configurable to be coupled to provide the sensor data to the application processor, may be, e.g., the AP interface 114, shown in FIG. 3.

Figure 12:
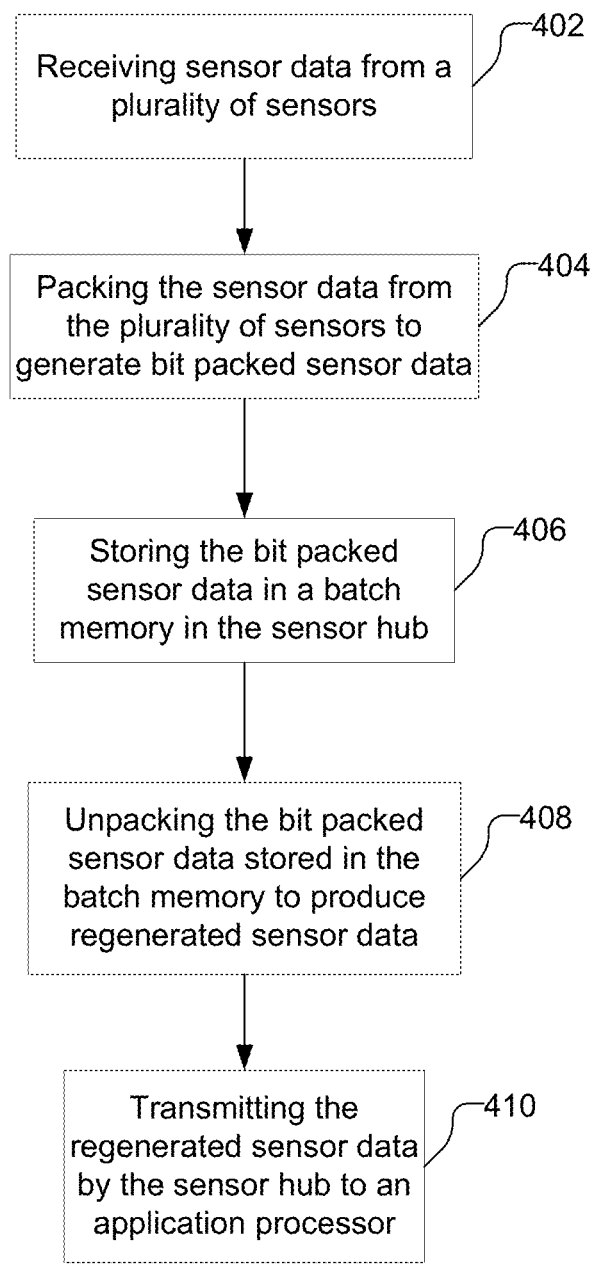
FIG. 12 is a flow chart illustrating a process of bit packing and unpacking sensor data in a sensor hub.

FIG. 12 is a flow chart illustrating a process of bit packing and unpacking sensor data in a sensor hub. As illustrated sensor data is received from a plurality of sensors (402). The sensor data from the plurality of sensors is packed to generate bit packed sensor data (404). Additionally, if desired, the sensor data may be compressed when packing the sensor data to generate the bit packed sensor data. For example, the sensor data may include multiple sets of sensor data, wherein each set of sensor data comprises a sensor identification, a time stamp, and measured data. The sensor data may be compressed by determining whether a current set of sensor data is a first set of sensor data from a sensor, and retaining the time stamp in the current set of sensor data if it is the first set of sensor data or removing the time stamp in the current set of sensor data if it is not the first set of sensor data. Additionally, or alternatively, the sensor identification may be removed from all sets of data.

The bit packed sensor data is stored in a batch memory in the sensor hub (406). The bit packed sensor data stored in the batch memory is unpacked to produce regenerated sensor data (408). Additionally, if desired, the bit packed sensor data may be decompressed when producing the regenerated sensor data. For example, where the sensor data includes multiple sets of sensor data, wherein each set of sensor data comprises a sensor identification, a time stamp, and measured data, the bit packed sensor data may be decompressed by first obtaining a sampling rate for the sensor, obtaining the time stamp from the first set of sensor data for the sensor, and obtaining a number of sets of bit packed sensor data between a current set of bit packed sensor data and a first set of bit packed sensor data. The bit packed sensor data is decompressed by inserting the time stamp in each set of bit packed sensor data from which the time stamp was removed based on the sampling rate, the time stamp from the first set of sensor data for the sensor, and the number of sets of bit packed sensor data between the current set of bit packed sensor data and the first set of bit packed sensor data. Additionally, the bit packed sensor data may be decompressed by inserting the sensor identification in all sets of sensor data. The regenerated sensor data may be transmitted by the sensor hub to an application processor (410).

Additionally, the process may include identifying each of the plurality of sensors to specify a bit length to be packed and unpacked for each of the plurality of sensors when packing and unpacking the sensor data. Further, the process may operate with different sampling rages, e.g., by inserting the time stamp in sets of compressed bit packed sensor data based on the time stamp from the first set of sensor data, a known sampling rate for the sensor, and a number of sets of bit packed sensor data between a current set of bit packed sensor data and a first set of bit packed sensor data.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A sensor hub comprising:
   a sensor interface configurable to be coupled to receive sensor data from a plurality of sensors, wherein the sensor data comprises a plurality of sets, wherein each set comprises a sensor identification, a time stamp, and measured data;
   a bit packer coupled to receive the sensor data from the sensor interface, the bit packer being configured to generate bit packed sensor data and to compress the sensor data when generating the bit packed sensor data;
   wherein the bit packer comprises a counter configured to count down from a number based on a bit size register which holds a current sensor's bit size, the bit size being the number of data bits per axis in the measured data of the current sensor;
   batching memory coupled to the bit packer to receive and store the bit packed sensor data;
   a bit unpacker coupled to the batching memory to receive and unpack the bit packed sensor data to regenerate the sensor data and to decompress the bit packed sensor data when regenerating the sensor data; and
   an application processor interface coupled to receive the sensor data from the bit unpacker, the application processor interface configurable to be coupled to provide the sensor data to an application processor.

2. The sensor hub of claim 1, wherein the bit packer is configured to remove the sensor identification for all sets in the plurality of sets.

3. The sensor hub of claim 1, wherein the bit unpacker is configured to decompress the bit packed sensor data by being configured to insert the time stamp in each set of bit packed sensor data from which the time stamp was removed based on the time stamp from the first set of sensor data, a known sampling rate for the current sensor, and a number of sets of bit packed sensor data between a current set of bit packed sensor data and a first set of bit packed sensor data.

4. The sensor hub of claim 3, wherein the bit unpacker is further configured to decompress the sensor data by inserting the sensor identification in all sets of sensor data.

5. The sensor hub of claim 1, wherein the bit packer and the bit unpacker are configurable to operate with different sensor sampling rates for the plurality of sensors.

6. The sensor hub of claim 1, wherein the bit packer is configurable to pack different numbers of data bits in the measured data from different sensors by storing a different bit size into the bit size register and using the counter to count down from the different bit size.

7. The sensor hub of claim 1 wherein:
   the bit packer comprises a parallel-in to serial-out shift register and a serial-in to parallel-out shift register coupled to one another;
   the parallel-in to serial-out shift register is configured to receive as input the sensor data in a parallel format and to output the sensor data in a serial data stream, one bit at a time on each clock cycle; and
   the serial-in to parallel-out shift register is configured to receive as input the serial data stream and to output to the batching memory, words of word length of the batching memory.

8. The sensor hub of claim 7 wherein:
   the bit packer comprises multiplexors coupled to the parallel-in to serial-out shift register to supply thereto the sensor data in the parallel format; and
   after the sensor data is read out of the parallel-in to serial-out shift register, the counter is configured to cause the multiplexers to select a next word of the sensor data to be entered into the parallel-in to serial-out shift register.

9. The sensor hub of claim 1 wherein the current sensor is hereinafter a first sensor, and wherein:
   the measured data of multiple sets, which is read by the first sensor at corresponding multiple times, is stored contiguously in a first allocated region of the batching memory; and
   the first allocated region is different from a second allocated region of the batching memory in which is stored contiguously the measured data read by a second sensor.

10. The sensor hub of claim 1 wherein:
the bit packer is configured to store in the batching memory, in a current region allocated for the current sensor, the time stamp in a word associated with the measured data of a first set for the current sensor, and to not retain in the current region any time stamp of one or more subsequent sets for the current sensor.

11. The sensor hub of claim 6 wherein:
the bit packer comprises a shadow register and a parallel-in to serial-out shift register; and
the different bit size is loaded into the bit size register from the shadow register when the sensor identification in the parallel-in to serial-out shift register does not match a current sensor identification.

12. A method comprising:
receiving sensor data from a plurality of sensors, wherein the sensor data comprises a plurality of sets, wherein each set comprises a sensor identification, a time stamp, and measured data;
packing the sensor data from the plurality of sensors to generate bit packed sensor data;
compressing the sensor data when packing the sensor data to generate the bit packed sensor data, wherein the compressing of the sensor data comprises:
counting down from a number based on a current sensor's bit size, the bit size being the number of data bits per axis in the measured data of the current sensor;
storing the bit packed sensor data in a batch memory in a sensor hub;
unpacking the bit packed sensor data stored in the batch memory to produce regenerated sensor data;
decompressing the bit packed sensor data when producing the regenerated sensor data; and
transmitting the regenerated sensor data by the sensor hub to an application processor.

13. The method of claim 12, wherein compressing the sensor data further comprises removing the sensor identification for all sets in the plurality of sets.

14. The method of claim 12, wherein decompressing the bit packed sensor data comprises:
obtaining a sampling rate for the current sensor;
obtaining the time stamp from the first set of sensor data for the current sensor;
obtaining a number of sets of bit packed sensor data between a current set of bit packed sensor data and a first set of bit packed sensor data; and
inserting the time stamp in each set of bit packed sensor data from which the time stamp was removed based on the sampling rate, the time stamp from the first set of sensor data for the current sensor, and the number of sets of bit packed sensor data between the current set of bit packed sensor data and the first set of bit packed sensor data.

15. The method of claim 14, wherein decompressing the bit packed sensor data further comprises inserting the sensor identification in all sets of sensor data.

16. The method of claim 12, further comprising configuring the packing to pack different numbers of data bits in the measured data from different sensors, by at least using a different bit size in the counting down.

17. The method of claim 12 wherein:
the packing comprises receiving as input the sensor data in a parallel format and converting the sensor data into a serial data stream one bit at a time on each clock cycle.

18. The method of claim 12 wherein:
the measured data of multiple sets, which is read by the first sensor at corresponding multiple times, is stored contiguously in a first allocated region of the batch memory; and
the first allocated region is different from a second allocated region of the batch memory in which is stored contiguously the measured data read by a second sensor.

19. The method of claim 12 wherein:
in the batch memory, the bit packed sensor data is stored in a current region allocated for the current sensor with the time stamp being stored in a word associated with the measured data of a first set for the current sensor and without any time stamp being stored for one or more subsequent sets for the current sensor.

20. A sensor hub comprising:
means for interfacing with sensors that is configurable to be coupled to receive sensor data from a plurality of sensors, wherein the sensor data comprises a plurality of sets, wherein each set comprises a sensor identification, a time stamp, and measured data;
means for bit packing sensor data received from the plurality of sensors to generate bit packed sensor data and to compress the sensor data when generating the bit packed sensor data;
wherein means for bit packing comprises means for counting down from a number based on a bit size register which holds a current sensor's bit size, the bit size being the number of data bits per axis in the measured data of the current sensor;
means for storing the bit packed sensor data;
means for bit unpacking the bit packed sensor data to regenerate the sensor data and to decompress the bit packed sensor data when regenerating the sensor data; and
means for interfacing with an application processor that is configurable to be coupled to provide the sensor data to the application processor.

21. The sensor hub of claim 20 wherein the means for bit packing compresses the sensor data by removing the sensor identification from all sets in the plurality of sets.

22. The sensor hub of claim 20, wherein the means for bit unpacking decompresses the bit packed sensor data by inserting the time stamp in each set of bit packed sensor data from which the time stamp was removed based on the time stamp from the first set of sensor data, a known sampling rate for the current sensor, and a number of sets of bit packed sensor data between a current set of bit packed sensor data and a first set of bit packed sensor data.

23. The sensor hub of claim 20, wherein the means for bit unpacking is further configured to decompresses the bit packed sensor data by inserting the sensor identification in all sets of sensor data.

24. The sensor hub of claim 20, wherein the means for bit packing are configurable to pack different numbers of data bits in the measured data from different sensors, by at least using a different bit size in the means for counting down.

* * * * *